(12) United States Patent
Zhang et al.

(10) Patent No.: US 12,353,704 B2
(45) Date of Patent: Jul. 8, 2025

(54) PAGE DISPLAY METHOD AND APPARATUS, ELECTRONIC DEVICE, STORAGE MEDIUM AND PROGRAM PRODUCT

(71) Applicant: Beijing Zitiao Network Technology Co., Ltd., Beijing (CN)

(72) Inventors: Wenshu Zhang, Beijing (CN); Huayun Miao, Beijing (CN); Wentao Ruan, Beijing (CN); Xingge Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/736,426

(22) Filed: Jun. 6, 2024

(65) Prior Publication Data

US 2024/0319865 A1    Sep. 26, 2024

Related U.S. Application Data

(63) Continuation of application No. PCT/CN2023/070042, filed on Jan. 3, 2023.

(30) Foreign Application Priority Data

Jan. 11, 2022  (CN) .......................... 202210028254.9

(51) Int. Cl.
*G06F 3/0488*  (2022.01)
*G06F 3/0481*  (2022.01)
*G06F 3/04845* (2022.01)

(52) U.S. Cl.
CPC .......... *G06F 3/0488* (2013.01); *G06F 3/0481* (2013.01); *G06F 3/04845* (2013.01);
(Continued)

(58) Field of Classification Search
CPC .. G06F 3/0488; G06F 3/0481; G06F 3/04845; G06F 2203/04804; G06F 2203/04808
See application file for complete search history.

(56) References Cited

U.S. PATENT DOCUMENTS 10,551,987 B2 *  2/2020 Chae ................... G06F 3/04883
2009/0231278 A1   9/2009 St. Hilaire et al.
(Continued)

FOREIGN PATENT DOCUMENTS

CN         103019594 A     4/2013
CN         304737303 S     7/2018
(Continued)

OTHER PUBLICATIONS

International Search Report and Written Opinion received for PCT Patent Application No. PCT/CN2023/070042, mailed on May 23, 2023, 12 pages.
(Continued)

*Primary Examiner* — Beau D Spratt
(74) *Attorney, Agent, or Firm* — Astute IP Law Group (57) ABSTRACT

A page display method, an apparatus, an electronic device, a storage medium, and a program product are provided. The method includes: displaying a video play page, wherein an original video image of a currently played video, video information, and a first interactive control are displayed in the video play page, the original video image is displayed in a video play region of the video play page, and the video information and at least one first interactive control are displayed on an upper layer of the original video image; and in response to a first multi-finger operation gesture acting on the video play page, stopping displaying the first interactive control and the video information in the video play region, and displaying a second interactive control in a preset region outside the video play region.

20 Claims, 6 Drawing Sheets

(52) U.S. Cl.
CPC .............. *G06F 2203/04804* (2013.01); *G06F 2203/04808* (2013.01)

(56) References Cited

U.S. PATENT DOCUMENTS

| | | | |
|---|---|---|---|
| 2011/0010626 A1 | 1/2011 | Fino et al. | |
| 2011/0252357 A1 | 10/2011 | Chaudhri | |
| 2012/0084681 A1* | 4/2012 | Cassar | G06F 3/048 715/761 |
| 2012/0159402 A1* | 6/2012 | Nurmi | G06F 3/04883 715/863 |
| 2013/0080956 A1 | 3/2013 | Sirpal et al. | |
| 2014/0033040 A1* | 1/2014 | Thomas | G06F 9/44505 715/721 |
| 2014/0282001 A1* | 9/2014 | Lau | G06F 3/0488 715/723 |
| 2015/0100885 A1* | 4/2015 | Riley | G06F 3/04883 715/720 |
| 2017/0372678 A1 | 12/2017 | Ying | |
| 2020/0014961 A1* | 1/2020 | Ramaswamy | H04N 21/234345 |
| 2022/0179545 A1 | 6/2022 | Ge | |
| 2023/0039978 A1* | 2/2023 | Bi | G06F 3/04883 |

FOREIGN PATENT DOCUMENTS

| | | |
|---|---|---|
| CN | 108762634 A | 11/2018 |
| CN | 108924633 A | 11/2018 |
| CN | 109343916 A | 2/2019 |
| CN | 109529319 A | 3/2019 |
| CN | 110032326 A | 7/2019 |
| CN | 110647286 A | 1/2020 |
| CN | 111078112 A | 4/2020 |
| CN | 111263170 A | 6/2020 |
| CN | 111294637 A | 6/2020 |
| CN | 111475070 A | 7/2020 |
| CN | 114385297 A | 4/2022 |
| EP | 4090035 A1 | 11/2022 |

OTHER PUBLICATIONS

Office Action for Chinese Patent Application No. 202210028254.9, mailed on Mar. 22, 2023, 37 pages.

Extended European Search Report for European Patent Application No. 23739836.7, mailed on Feb. 3, 2025, 12 pages.

* cited by examiner

FIG. 9

PAGE DISPLAY METHOD AND APPARATUS, ELECTRONIC DEVICE, STORAGE MEDIUM AND PROGRAM PRODUCT

CROSS-REFERENCE TO RELATED APPLICATION

This application is a continuation of International Patent Application No. PCT/CN2023/070042, filed on Jan. 3, 2023, which claims the priority to and benefits of Chinese patent application No. 202210028254.9, filed on Jan. 11, 2022. All the aforementioned patent applications are hereby incorporated by reference in their entireties.

TECHNICAL FIELD

Embodiments of the present disclosure relate to the field of computer technology, such as a page display method, an apparatus, an electronic device, a storage medium and a program product.

BACKGROUND

Currently, when a video is played on the current video play page, interactive controls are generally displayed in the video play region for users to interact.

In the related technology, users need to go through a series of operations to view the video screen blocked by the interactive control in the video play region. The operations are relatively cumbersome, resulting in a poor user experience.

SUMMARY

Embodiments of the present disclosure provide a page display method, an apparatus, an electronic device, a storage medium, and a program product to simplify the operations required to view a complete video image.

In the first aspect, the embodiments of the present disclosure provide a page display method, and the method comprises:
  displaying a video play page, wherein an original video image of a currently played video, video information, and a first interactive control are displayed in the video play page, the original video image is displayed in a video play region of the video play page, and the video information and at least one first interactive control are displayed on an upper layer of the original video image; and
  in response to a first multi-finger operation gesture acting on the video play page, stopping displaying the first interactive control and the video information in the video play region, and displaying a second interactive control in a preset region outside the video play region.

In the second aspect, the embodiments of the present disclosure further provide a page display apparatus, and the apparatus comprises:
  a page display module, configured to display a video play page, wherein an original video image of a currently played video, video information, and a first interactive control are displayed in the video play page, the original video image is displayed in a video play region of the video play page, and the video information and at least one first interactive control are displayed on an upper layer of the original video image; and
  a response module, configured to, in response to a first multi-finger operation gesture acting on the video play page, stop displaying the first interactive control and the video information in the video play region, and display a second interactive control in a preset region outside the video play region.

In the third aspect, the embodiments of the present disclosure further provide an electronic device, the electronic device comprises:
  one or more processors; and
  a memory, configured to store one or more programs,
  when the one or more programs are executed by the one or more processors, the one or
  more processors are caused to implement the page display method as described in the embodiments of the present disclosure.

In the fourth aspect, the embodiments of the present disclosure further provide a computer-readable storage medium, on which a computer program is stored, and when the computer program is executed by a processor, the page display method as described in the embodiments of the present disclosure is implemented.

In the fifth aspect, the embodiments of the present disclosure further provide a computer program product, and when the computer program product is executed by a computer, the computer is caused to implement the page display method as described in the embodiments of the present disclosure.

BRIEF DESCRIPTION OF THE DRAWINGS

Throughout the drawings, the same or similar reference numbers refer to the same or similar elements. It should be understood that the drawings are schematic, and the components and elements are not necessarily drawn to scale.

DETAILED DESCRIPTION

It should be understood that multiple steps described in the method implementations of the present disclosure may be executed in different orders and/or in parallel. Furthermore, method embodiments may include additional steps and/or omit performance of illustrated steps. The scope of the present disclosure is not limited in this regard.

As used herein, the term "include" and its variations are open-ended, i.e., "include but not limited to." The term "based on" means "at least partially based on." The term "an embodiment" means "at least one embodiment"; the term "another embodiment" means "at least one other embodiment"; and the term "some embodiments" means "at least some embodiments". Relevant definitions of other terms will be given in the description below.

It should be noted that concepts such as "first", "second", etc. mentioned in this disclosure are only used to distinguish different devices, modules or units, and are not used to limit the order of functions performed by these devices, modules or units or interdependence.

It should be noted that the modifications of "one" and "plurality" mentioned in this disclosure are illustrative and are not restrictive. Those skilled in the art would understand that unless the context clearly indicates otherwise, it should be understood as "one or multiple".

The names of messages or information exchanged between multiple devices in the embodiments of the present disclosure are for illustrative purposes only and are not used to limit the scope of these messages or information.

Figure 1:
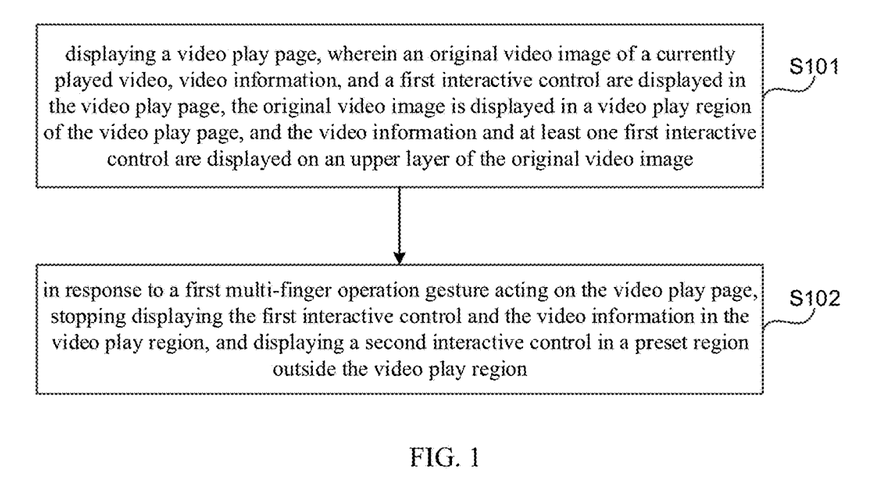
FIG. 1 is a schematic flowchart of a page display method provided by embodiments of the present disclosure.

FIG. 1 is a schematic flowchart of a page display method provided by the embodiments of the present disclosure. The method can be performed by a page display apparatus, the apparatus can be implemented by software and/or hardware, and can be configured in an electronic device, for example, can be configured in a mobile phone or a tablet computer. The page display method provided by the embodiments of the present disclosure is suitable for the scenario of completely viewing the video image. As illustrated in FIG. 1, the page display method provided by this embodiment may include following operations.

S101, displaying a video play page. An original video image of a currently played video, video information, and a first interactive control are displayed in the video play page, the original video image is displayed in a video play region of the video play page, and the video information and at least one first interactive control are displayed on an upper layer of the original video image.

The currently played video can be the video currently played on the video play page. The original video image may be the video image of the original size contained in the currently played video, that is, the video image that has not been magnified. The first interactive control may be a control displayed on the video play page for the user to interact, such as a page switching control for switching the current page from the video play page to another page and/or controls for the user to like, comment, share or collect the currently played video, etc. The video play region may be a region on the video play page used for playing videos, that is, a region used for displaying video images.

Figure 2:
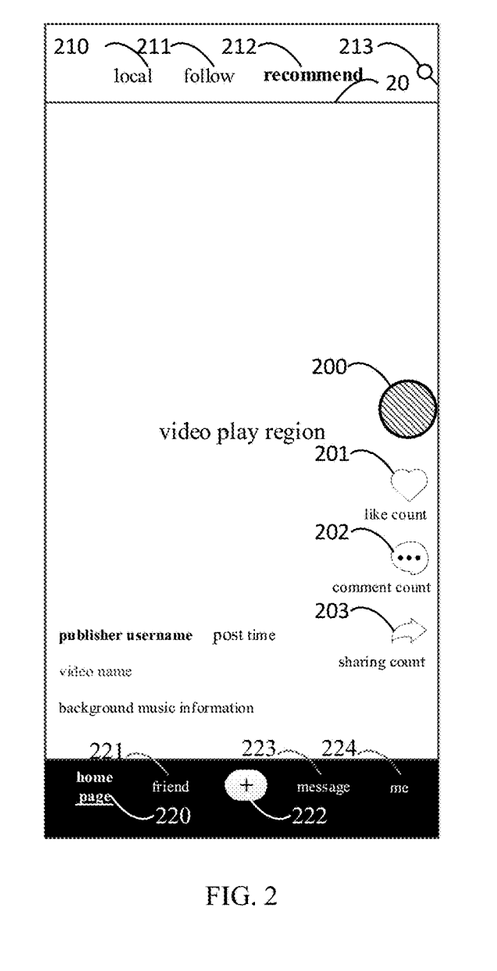
FIG. 2 is a schematic diagram of a video play page provided by embodiments of the present disclosure.

For example, as illustrated in FIG. 2, the electronic device can display a video play page based on the user's triggering operation, and play the currently played video in the video play page, that is, display the original video image (not illustrated in the figure) of the currently played video in the video play region 20 of the video play page. Some or all of the first interactive controls are displayed on the upper layer of the original video image. For example, the publisher's personal homepage control 200, like control 201, comment control 202, share control 203, etc. can be displayed on the upper layer of the original video image, and the video information of the currently played video is displayed in the video play region, such as the user name of the publisher of the currently played video, posting time, video name and/or background music information, etc.

In addition, some of the first interactive controls can also be displayed outside the video play region. For example, the local control 210, follow control 211, recommendation control 212, and search control 213 can be displayed above the video play region, and/or, the homepage control 220, friend control 221, capturing control 222, message control 223, user's personal homepage control 224, etc. are displayed below the video play region.

S102, in response to a first multi-finger operation gesture acting on the video play page, stopping displaying the first interactive control and the video information in the video play region, and displaying a second interactive control in a preset region outside the video play region.

The first multi-finger operation gesture can be a multi-finger magnification gesture or a multi-finger minification gesture, such as a two-finger magnification gesture/two-finger minification gesture or a three-finger magnification gesture/three-finger minification gesture, etc. In the following, the description takes the first multi-finger operation gesture being a two-finger magnification gesture as an example. The two-finger magnification gesture may be a touch gesture in which the distance between two touch points gradually increases. The second interactive control may be interactive controls that are completely different from, partially the same as, or completely the same as the first interactive control. For example, the second interactive control may include controls for the user to interact with the currently played video, such as a like control, a comment control, a share control, etc. of the currently played video, and can also include a speed control and a restore control.

Figure 3:
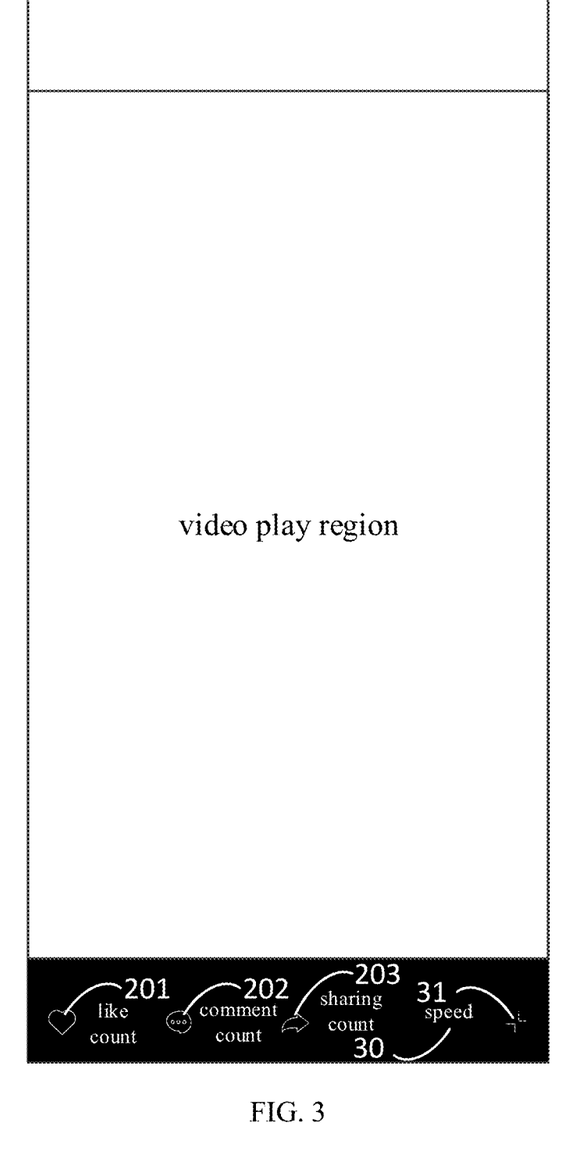
FIG. 3 is a schematic diagram of another video play page provided by embodiments of the present disclosure.

For example, users can watch the currently played video on the video play page, and when they want to completely view the video image of the currently played video, the use performs the first multi-finger operation gesture on the video play page. Correspondingly, when detecting that users perform the first multi-finger operation gesture on the video play page, the electronic device stops displaying the first interactive control in the video play region, such as stopping displaying the first interactive control located within the video play region, or, stopping displaying all the first interactive controls displayed in the video play page, and stops displaying the video information displayed in the video play page, and displays the second interactive control in a preset region outside the video play region. For example, the like control 201, comment control 202 and sharing control 203 of the currently played video can be displayed below the video play region, as illustrated in FIG. 3, so as to facilitate users to interact with the currently played video. In addition, as illustrated in FIG. 3, the speed control 30 and the restore control 31 can also be displayed in a preset region outside the video play region, so that users can adjust the play speed of the currently played video by triggering the speed control 30, and/or, by triggering the restore control 31 to instruct the electronic device to display the plurality of interactive controls again at the original display positions of the plurality of interactive controls.

In this embodiment, the user can instruct the electronic device to cancel the display of the interactive controls and video information displayed in the video play region by performing a simple multi-finger magnification gesture on the video play page, and completely view the video image displayed in the video play region without permanently displaying the clear screen control on the video play page, and there is no need to instruct the electronic device to display the screen clear control through a series of operations on the video play page, which can reduce the number of controls displayed on the video play page, and simplify the operations required to fully view the video image, achieve quick screen clearing, and improve the user's video viewing experience.

In one implementation, as illustrated in FIG. 3, upon receiving the first multi-finger operation gesture, all the first interactive controls and video information in the video play page can be stopped to be displayed, that is, stopping displaying the first interactive controls located within the video play region and the first interactive controls located outside the video play region, and stopping displaying the video information displayed in the video play region. At this time, for example, stopping displaying the first interactive control and the video information in the video play region includes: stopping displaying all the first interactive controls and the video information displayed in the video play page.

In the above embodiments, the method of stopping displaying the first interactive control and video information displayed in the video play page can be flexibly set, for example, the display of the first interactive control displayed in the video play region can be directly canceled. For example, stopping displaying all the first interactive controls and the video information displayed in the video play page includes: controlling the first interactive controls and the video information to move out of the video play page along the corresponding movement direction. That is, the first interactive controls and video information located at different positions on the video play page can be controlled to move out of the video play page along different directions, so as to stop displaying multiple first interactive controls and video information. For example, multiple first interactive controls located above the video play region can be controlled to move up and move out of the video play page, multiple first interactive controls located below the video play region can be controlled to move down and move out of the video play page, and multiple first interactive controls located on the right inside the video play region can be controlled to move to the right and move out of the video play page, and when the video information of the currently played video is displayed on the left side inside the video play region, the video information of the currently played video can be controlled to move to the left and move out of the video play page.

It can be understood that, as illustrated in FIG. 2 and FIG. 3, when the first interactive controls and the second interactive controls contain the same interactive control, such as when a certain interactive control is displayed in the video play region and is displayed in the preset region, this interactive control can be displayed in different display states, such as displaying this interactive control in different display styles and/or different display sizes. In addition, in this embodiment, when receiving the first multi-finger operation gesture, the interactive controls that are only included in the first interactive controls but not included in the second interactive controls are stopped to be displayed, and the interactive controls included in both the first interactive controls and the second interactive controls displayed on the video play page are controlled to be moved from the original display position within the video play region to a preset region outside the video play region for display, and the display state of multiple video interactive controls can be adjusted before, during, and/or after the movement.

Figure 4:
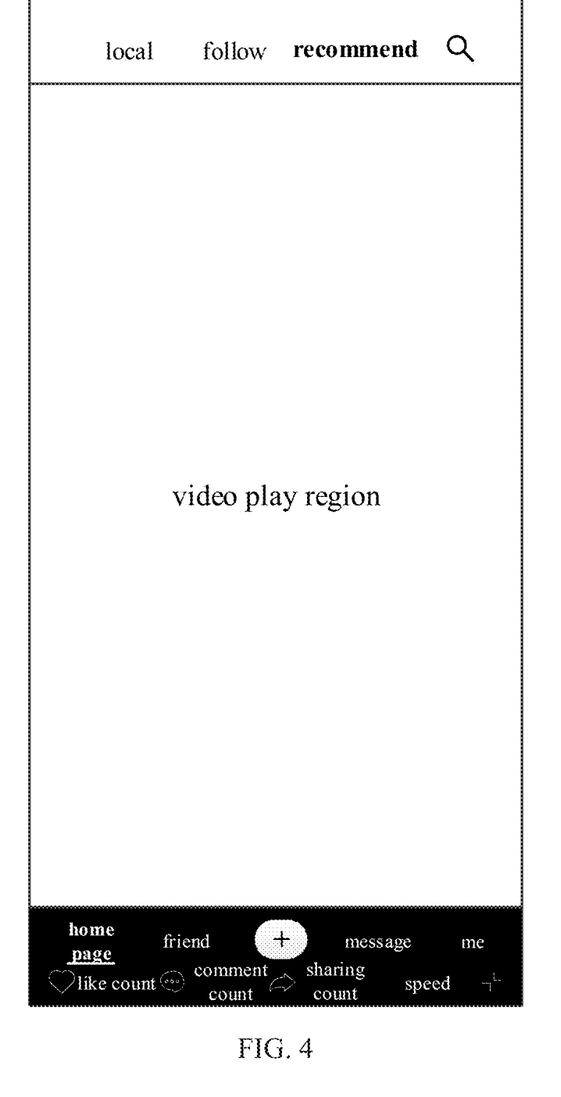
FIG. 4 is a schematic diagram of yet another video play page provided by embodiments of the present disclosure.

In another implementation, as illustrated in FIG. 4, when receiving the first multi-finger operation gesture, it is also possible to stop displaying only the first interactive controls and video information displayed in the video play region, that is, only stopping displaying the first interactive controls and video information located within the video play region, and keeping displaying the first interactive controls located outside the video play region. At this time, for example, stopping displaying the first interactive control and the video information in the video play region includes: stopping displaying the first interactive control and the video information located within the video play region.

In the page display method provided by this embodiment, a video play page is displayed. An original video image of a currently played video, video information, and a first interactive control are displayed in the video play page, the original video image is displayed in a video play region of the video play page, and the video information and at least one first interactive control are displayed on an upper layer of the original video image. In response to a first multi-finger operation gesture acting on the video play page, the first interactive control and the video information in the video play region are stopped to be displayed, and a second interactive control is displayed in a preset region outside the video play region. By adopting the above technical solution, this embodiment cancels the display of interactive controls displayed in the video play region based on the user's multi-finger magnification gesture, which can simplify the operations required to fully view the video image and improve the user's video viewing experience.

Figure 5:
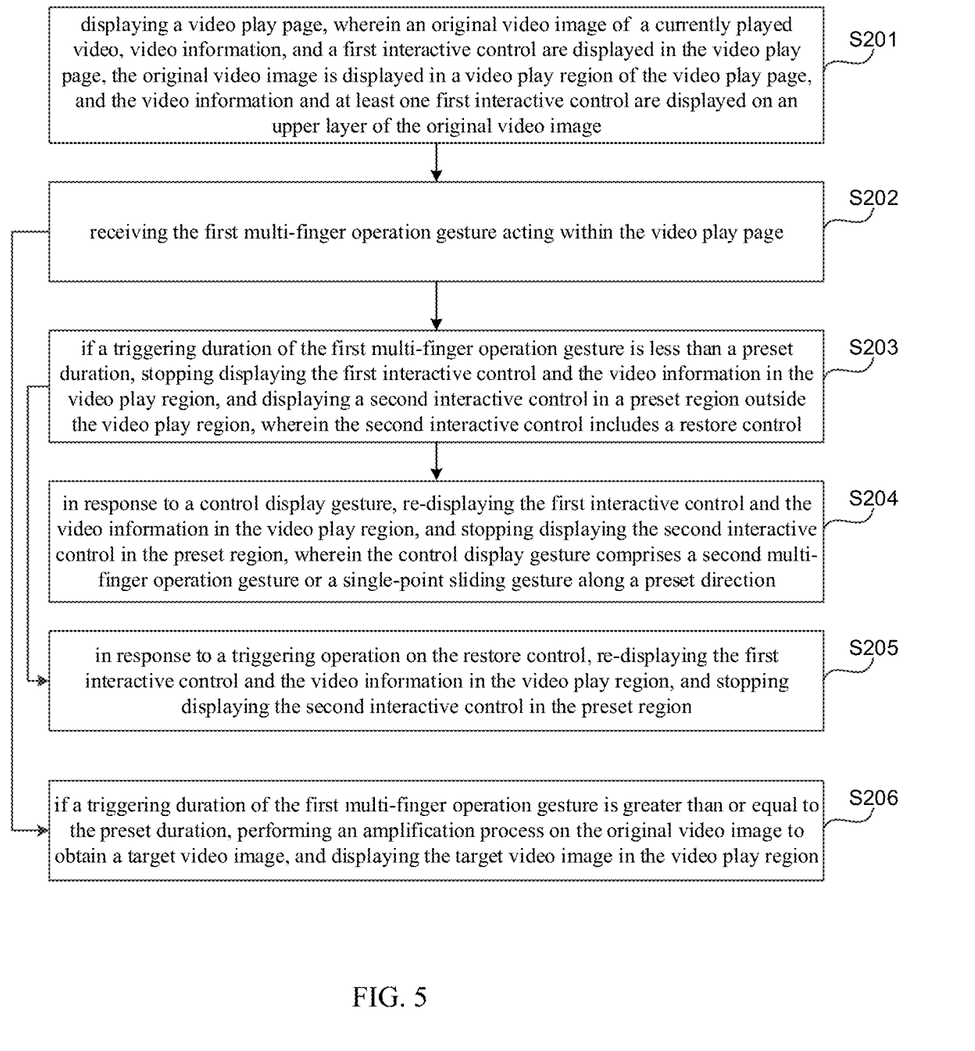
FIG. 5 is a flow diagram of another page display method provided by embodiments of the present disclosure.

FIG. 5 is a schematic flowchart of another page display method provided by embodiments of the present disclosure. The solutions in this embodiment can be combined with one or more example solutions in the above embodiments. For example, after stopping displaying the first interactive control and the video information in the video play region, the method further includes: in response to a control display gesture, re-displaying the first interactive control and the video information in the video play region, and stopping displaying the second interactive control in the preset region. The control display gesture comprises a second multi-finger operation gesture or a single-point sliding gesture along a preset direction.

For example, the second interactive control includes a restore control, after stopping displaying the first interactive control in the video play region, the method further includes: in response to a triggering operation on the restore control, re-displaying the first interactive control and the video information in the video play region, and stopping displaying the second interactive control in the preset region.

For example, stopping displaying the first interactive control and the video information in the video play region and displaying the second interactive control in the preset region outside the video play region includes: if a triggering duration of the first multi-finger operation gesture is less than a preset duration, stopping displaying the first interactive control and the video information in the video play region, and displaying the second interactive control in the preset region outside the video play region.

For example, the page display method provided by this embodiment also includes: if the triggering duration of the first multi-finger operation gesture is greater than or equal to the preset duration, performing an amplification process on the original video image to obtain a target video image, and displaying the target video image in the video play region.

Correspondingly, as illustrated in FIG. 5, the page display method provided by this embodiment may include following operations.

S201, displaying a video play page. An original video image of a currently played video, video information, and a first interactive control are displayed in the video play page, the original video image is displayed in a video play region of the video play page, and the video information and at least one first interactive control are displayed on an upper layer of the original video image.

S202, receiving the first multi-finger operation gesture acting within the video play page and executing S203 or S206.

S203, if a triggering duration of the first multi-finger operation gesture is less than a preset duration, stopping displaying the first interactive control and the video information in the video play region, and displaying a second interactive control in a preset region outside the video play region, and executing S204 or S205. The second interactive control includes a restore control.

In this embodiment, regardless of the triggering duration of the gesture, when the user performs the first multi-finger operation gesture, the display of the first interactive control and video information in the video play region is stopped. The triggering duration of the first multi-finger operation gesture can also be considered, and display of the first interactive control and the video information in the video play region is stopped only when the triggering duration of the first multi-finger operation gesture performed by the user is less than the preset duration. When the triggering duration of the operation gesture is greater than or equal to the preset duration, the video image is magnified based on the first multi-finger operation gesture to simultaneously meet the user's screen clearing needs and screen magnification needs, this embodiment takes this situation as an example to illustrate.

The preset duration can be set as needed. For example, the preset duration can be set to 200 ms. In this case, correspondingly, when the triggering duration of the first multi-finger operation gesture performed by the user is less than 200 ms, display of the first interactive control and video information in the video play area is stopped, and the second interactive control is displayed in a preset region outside the video play region; when the triggering duration of the second multi-finger magnification gesture performed by the user is greater than or equal to 200 ms, the video image can be magnified based on the second multi-finger operation gesture.

In this embodiment, because when the triggering duration of the first multi-finger magnification gesture is less than the preset duration and the triggering has not ended, it is not clear whether the video image needs to be magnified, so when the triggering duration of the first multi-finger magnification gesture is less than the preset duration and the triggering is not completed, the video image may be initially magnified, and when the triggering is completed, different responses may be performed based on the triggering duration of the first multi-finger operation gesture. In this case, for example, in response to a first multi-finger operation gesture acting on the video play page, stopping displaying the first interactive control and the video information in the video play region, and displaying a second interactive control in a preset region outside the video play region, includes: during the execution process of the first multi-finger operation gesture acting on the video play page, magnifying the original video image based on a magnification proportion coefficient and a distance increment between two touch points corresponding to the first multi-finger operation gesture to obtain the target video image, and displaying the target video image in the video play region; when the execution of the first multi-finger operation gesture ends, if the triggering duration of the first multi-finger operation gesture is less than a preset duration, stopping displaying the first interactive control and the video information in the video play region, and displaying a second interactive control in a preset region outside the video play region, and restoring the target video image displayed in the video play region to the original video image before the magnification process.

Figure 6:
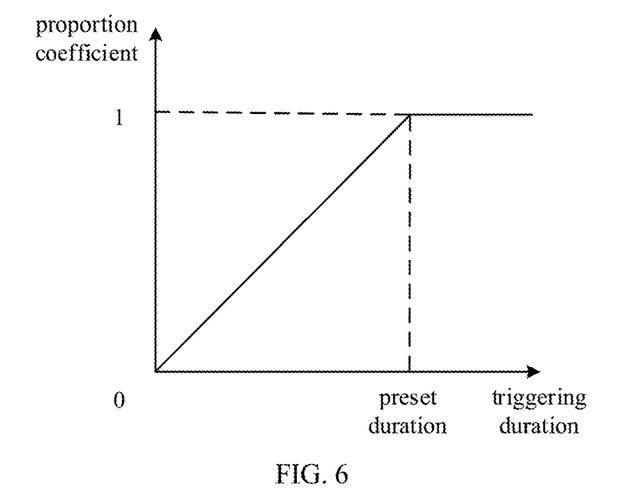
FIG. 6 is a schematic diagram of a preset magnification proportion coefficient curve provided by embodiments of the present disclosure.
Figure 7:
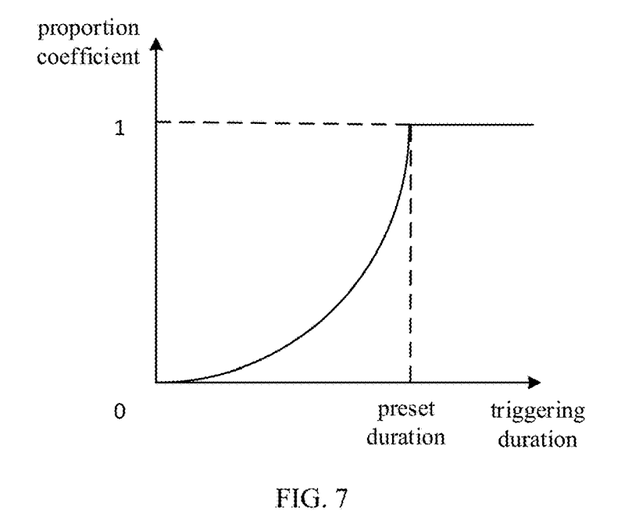
FIG. 7 is a schematic diagram of another preset magnification proportion coefficient curve provided by embodiments of the present disclosure.

The magnification proportion coefficient can be determined based on a preset magnification proportion coefficient curve, and the preset magnification proportion coefficient curve can be a curve of the magnification proportion coefficient varying with the triggering duration. In order to smoothly combine screen clearing with video image magnification, for example, in the preset magnification proportion coefficient curve, when the triggering duration is less than the preset duration, the magnification proportion coefficient is less than 1; when the triggering duration is greater than or equal to the preset duration, the magnification proportion coefficient is greater than or equal to 1. That is, when the triggering duration is less than the preset duration, the magnification effect of the video image is suppressed, thereby reducing the interruption of the video image magnification during the screen clearing process; when the triggering duration is greater than or equal to the preset duration, the video image is normally magnified and the deviation between the normal magnification and the magnification caused by suppressing the magnification effect within the preset time duration is made up, thereby avoiding the sudden and large increase in the video image during the video image magnification process, that is, avoiding gaps in the video image magnification process. Here, the preset magnification proportion coefficient curve can be a linear curve, as illustrated in FIG. 6, or it can be a nonlinear curve, as illustrated in FIG. 7.

The distance increment between two touch points corresponding to the first multi-finger operation gesture can be understood as the increased amount of the distance value between the two touch points, which can be calculated based on the distance between the two touch points at the current moment and the initial distance between the two touch points, that is, by calculating the difference between the two. Different distance increments correspond to different magnification ratios, and there can be a proportional relationship between the two. That is, the greater the distance increment, the greater the magnification ratio. The corresponding relationship between the distance increment and the magnification ratio can be preset by the developer. The target video image is a video image obtained by magnifying the original video image in the currently played video based on the first multi-finger operation gesture.

For example, during the triggering process of the first multi-finger operation gesture, the current magnification proportion coefficient at the current moment can be determined according to the preset magnification proportion coefficient curve, and the current magnification ratio can be determined according to distance increment between the two touch points corresponding to the first multi-finger operation gesture; the current magnification multiple of the current original video image is determined according to the current magnification proportion coefficient and the current magnification ratio; whether the current magnification multiple is greater than 1 is determined, and if so, the current original video image displayed in the video play region is magnified based on the current magnification multiple; if not, the original video image of the currently played video continues to be displayed in the video play region, that is, the current original video image displayed in the video play region is not magnified.

When the triggering of the first multi-finger operation gesture ends within the preset duration, the interactive controls can be stopped to be displayed in the video play region, and it can be determined whether the original video image of the currently played video is displayed in the video play region is determined. If so, then the original video image of the currently played video continues to be played in the video play region; if not, the magnified target video image displayed in the video play region can be restored to the original video image before magnification, and the original video image of the currently played video continues to be played in the video play region.

S204, in response to the control display gesture, re-displaying the first interactive control and the video information in the video play region, and stopping displaying the second interactive control in the preset region, and ending the operation. The control display gestures include the second multi-finger operation gesture or a single-point sliding gesture along a preset direction.

The control display gesture may be a gesture that instructs the electronic device to display multiple interactive controls in the video play page again at the original display position, such as a second multi-finger operation gesture or a single-point sliding gesture along a preset direction. The second multi-finger operation gesture may be a gesture different from the first multi-finger operation gesture. For example, when the first multi-finger operation gesture is a multi-finger magnification gesture, the second multi-finger operation gesture may be a multi-finger minification gesture; when the first multi-finger operation gesture is a multi-finger minification gesture, the second multi-finger operation gesture may be a multi-finger magnification gesture. The preset direction can be set as needed, for example, the preset direction can be set to upward.

For example, when the user wants to instruct the electronic device to display the first interactive control and video information again in the video play region, the user can perform a second multi-finger operation gesture or a single-point sliding gesture along a preset direction on the video play page. Therefore, when the electronic device detects the user's second multi-finger operation gesture or single-point sliding gesture along the preset direction, it can re-display the first interactive control and video information in the video play region, and stop displaying the second interactive control in the preset region, which is illustrated in FIG. 2.

S205, in response to a triggering operation on the restore control, re-displaying the first interactive control and the video information in the video play region, and stopping displaying the second interactive control in the preset region.

For example, as illustrated in FIG. 3, after the electronic device stops displaying the first interactive control and video information in the video play region based on the user's first multi-finger operation gesture, the second interactive control including the restore control 31 can be displayed in a preset region outside the video play region. Therefore, when the user wants to instruct the electronic device to display the first interactive control and video information in the video play region again, the user can also trigger the restore control 31 displayed on the video play page. Therefore, when the electronic device detects that the user triggers the restore control 31 displayed on the video play page, the first interactive control and video information can be re-displayed in the video play region, and display of the second interactive control in the preset region is stopped, as illustrated in FIG. 2.

In addition, the user can also instruct the electronic device to increase the transparency of multiple interactive controls displayed in the video play page by performing a single-point sliding operation along a preset direction in the video play page, so as to view the video image blocked by interactive controls on the video play page. In this case, correspondingly, when the electronic device detects the user's single-point sliding operation along the preset direction, it can determine whether interactive controls are displayed in the video play region, that is, determining whether the interactive controls in the video play region are in a display state. If so, then the transparency of multiple interactive controls and/or video information displayed in the video play region is increased, such as increasing the transparency of multiple interactive controls and/or video information displayed in the video play region from the original transparency to the preset transparency; if not, multiple interactive controls and/or video information are displayed in the video play region again, such as using original transparency to display multiple interactive controls and/or video information in the video play region.

S206, if the triggering duration of the first multi-finger operation gesture is greater than or equal to the preset duration, performing an amplification process on the original video image to obtain a target video image, and displaying the target video image in the video play region.

For example, the user can watch the currently played video in the video play page, and when the user wants to magnify the video image displayed in the video play region, the use can execute the first multi-finger operation gesture on the video play page with a triggering duration greater than or equal to the preset duration. Correspondingly, when the electronic device receives the user's first multi-finger operation gesture, if it determines that the triggering duration of the first multi-finger operation gesture is greater than or equal to the preset duration, then the original video image displayed in the video play region can be magnifed based on the first multi-finger operation gesture, so as to obtain the target video image, and the target video image is displayed in the video play region.

Taking that the first multi-finger operation gesture is a two-finger operation gesture as an example, when the electronic device detects the first multi-finger operation gesture acting on the video play page, the original video image displayed in the video play region can be magnified, and the magnified target video image can be displayed in the video play region. When the execution of the first multi-finger operation gesture ends, it is determined whether the execution duration of the first multi-finger operation gesture is less than the preset duration. If so, the display of the first interactive control and video information in the video play region is stopped, and the second interactive control is displayed in the preset region outside the video play region, and the video image displayed in the video play region is switched to the original video image without magnification; if not, the magnified video image remains displayed in the video play region, and the original displayed first interactive control and video information are kept to be displayed in the video play region.

In this embodiment, the method of magnifying the original video image can be flexibly set. For example, the original video image can be magnified based on the magnification proportion coefficient and the distance increment between the two touch points. In this case, the first multi-finger operation gesture is a two-finger operation gesture, and magnifying the original video image includes: magnifying the original video image based on a magnification proportion coefficient and a distance increment between two touch points corresponding to the first multi-finger operation gesture.

In one implementation, magnifying the original video image based on a magnification proportion coefficient and a distance increment between two touch points corresponding to the first multi-finger operation gesture includes: determining a current magnification proportion coefficient according to a current triggering duration and a preset magnification proportion coefficient curve, and determining a current magnification ratio according to a current distance increment between the two touch points corresponding to the first multi-finger operation gesture, where the preset magnification proportion coefficient curve is a curve of magnification proportion coefficient varying with triggering duration; determining a current magnification multiple of a current original video image according to the current magnification proportion coefficient and the current magnification ratio; and magnifying the current original video image based on the current magnification multiple.

For example, the current magnification proportion coefficient corresponding to the current triggering duration can be determined based on the current triggering duration of the first multi-finger operation gesture at the current moment and the preset magnification proportion coefficient curve; and the current distance between two touch points corresponding to the first multi-finger operation gesture is obtained, the current distance increment is calculated based on the current distance and the initial distance between the two touch points, and the magnification ratio corresponding to the current distance increment serves as the current magnification multiple. Then, the current magnification multiple of the current original video image is determined according to the magnification proportion coefficient and the current magnification ratio. For example, the product of the current magnification proportion coefficient and the current magnification ratio is calculated as the current magnification multiple. And after calculating the current magnification multiple, the current original video image displayed in the video play region is magnified based on the current magnification multiple. For example, the current original video image can be magnified by the current magnification multiple to obtain the target video image, and the target video image is displayed in the video play region.

In this embodiment, in order to better suit the user's willingness to magnify the video image, for example, the current original video image displayed in the video play region can be magnified only when the current magnification multiple is greater than 1; and when the current magnification multiple is less than or equal to 1, the current original video image is directly displayed in the video play region to avoid the situation where the video image displayed in the video play region is reduced when the user performs the first multi-finger operation gesture. In this case, for example, performing the magnification process on the current original video image based on the current magnification multiple includes: if the current magnification multiple is greater than 1, then magnifying the current original video image based on the current magnification multiple.

In the page display method provided by this embodiment, the user can instruct the electronic device to stop displaying interactive controls in the video play region through a simple first multi-finger operation gesture, or to magnify the video image; through a simple second multi-finger operation gesture, a single-point sliding gesture along a preset direction or a triggering gesture on the restore control, the electronic device can be instructed to re-display the interactive controls in the video play region, which can simplify the operations required by the user and improve the user's video viewing experience on the premise of meeting the user's screen clearing needs, video image magnification and restoration needs.

Figure 8:
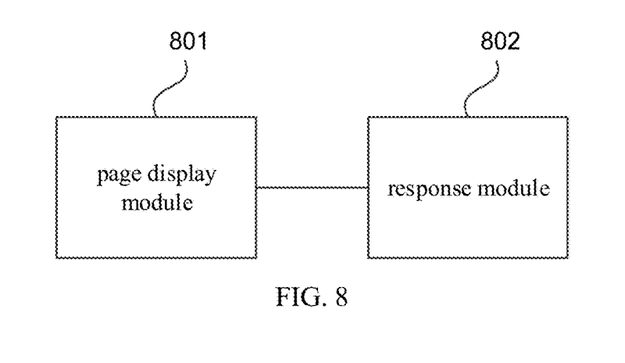
FIG. 8 is a structural block diagram of a page display apparatus provided by embodiments of the present disclosure.

FIG. 8 is a structural block diagram of a page display apparatus provided by embodiments of the present disclosure. The apparatus can be implemented by software and/or hardware, and can be configured in an electronic device, for example, in a mobile phone or tablet computer, and can display the video play page by executing the page display method. As illustrated in FIG. 8, the page display apparatus provided by this embodiment may include: a page display module 801 and a response module 802.

The page display module 801 is configured to display a video play page. An original video image of a currently played video, video information, and a first interactive control are displayed in the video play page, the original video image is displayed in a video play region of the video play page, and the video information and at least one first interactive control are displayed on an upper layer of the original video image.

The response module 802 is configured to, in response to a first multi-finger operation gesture acting on the video play page, stop displaying the first interactive control and the video information in the video play region, and display a second interactive control in a preset region outside the video play region.

In the page display apparatus provided by this embodiment, the video play page is displayed through the page display module. An original video image of a currently played video, video information, and a first interactive control are displayed in the video play page, the original video image is displayed in a video play region of the video play page, and the video information and at least one first interactive control are displayed on an upper layer of the original video image. Though the response module, in response to the first multi-finger operation gesture acting on the video play page, display of the first interactive control and the video information in the video play region is stopped, and a second interactive control is displayed in a preset region outside the video play region. By adopting the above technical solution, this embodiment can cancel the display of the interactive controls displayed in the video play region based on the user's first multi-finger operation gesture, thereby simplifying the operations required to fully view the video image and improving the user's video viewing experience.

In the above solutions, the response module 802 may be configured to: stop displaying all first interactive controls and the video information displayed in the video play page; or, stop displaying the first interactive control and the video information located within the video play region.

In the above solutions, the response module 802 may be configured to: control the first interactive controls and the video information to move out of the video play page along a corresponding movement direction.

For example, the page display apparatus provided by this embodiment may further include: a first control display module, which is configured to, after stopping displaying the first interactive control and the video information in the video play region, in response to a control display gesture, re-display the first interactive control and the video information in the video play region, and stop displaying the second interactive control in the preset region. The control display gesture includes a second multi-finger operation gesture or a single-point sliding gesture along a preset direction.

In the above solutions, the second interactive control may include a restore control, and the page display apparatus provided by this embodiment may further include: a second control display module, which is configured to, after stopping displaying the first interactive control in the video play region, in response to a triggering operation on the restore control, re-display the first interactive control and the video information in the video play region, and stop displaying the second interactive control in the preset region.

In the above solutions, the response module 802 may be configured to: if a triggering duration of the first multi-finger operation gesture is less than a preset duration, stop displaying the first interactive control and the video information in the video play region, and display a second interactive control in a preset region outside the video play region.

For example, the response module 802 may be further configured to: if the triggering duration of the first multi-finger operation gesture is greater than or equal to the preset duration, magnify the original video image to obtain a target video image, and display the target video image in the video play region.

In the above solutions, the first multi-finger operation gesture can be a two-finger operation gesture, and the response module 802 may be configured to: magnify the original video image based on a magnification proportion coefficient and a distance increment between two touch points corresponding to the first multi-finger operation gesture.

In the above solutions, the response module 802 can include: a coefficient determination unit, which is configured to determine a current magnification proportion coefficient according to a current triggering duration and a preset magnification proportion coefficient curve, and determine a current magnification ratio according to a current distance increment between the two touch points corresponding to the first multi-finger operation gesture, where the preset magnification proportion coefficient curve is a curve of magnification proportion coefficient varying with triggering period; a multiple determination unit, which is configured to determine a current magnification multiple of a current original video image according to the current magnification proportion coefficient and the current magnification ratio; a magnification processing unit, which is configured to magnify the current original video image based on the current magnification multiple.

In the above solutions, in the preset magnification proportion coefficient curve, when a triggering duration of the first multi-finger operation gesture is less than the preset duration, the magnification proportion coefficient can be less than 1; when a triggering duration of the first multi-finger operation gesture is greater than or equal to the preset duration, the magnification proportion coefficient can be greater than or equal to 1.

In the above solutions, the magnification processing unit can be configured to magnify the current original video image based on the current magnification multiple when the current magnification multiple is greater than 1.

In the above solutions, the response module 802 may be configured to:

during the execution process of the first multi-finger operation gesture acting on the video play page, magnify the original video image based on a magnification proportion coefficient and a distance increment between two touch points corresponding to the first multi-finger operation gesture to obtain the target video image, and display the target video image in the video play region; when the execution of the first multi-finger operation gesture ends, if the triggering duration of the first multi-finger operation gesture is less than the preset duration, stop displaying the first interactive control and the video information in the video play region, display a second interactive control in a preset region outside the video play region, and restore the target video image displayed in the video play region to the original video image before the magnification process.

The page display apparatus provided by the embodiments of the present disclosure can execute the page display method provided by any embodiment of the present disclosure, and has corresponding functional modules and beneficial effects for executing the page display method. For technical details that are not described in detail in this embodiment, the page display method provided by any embodiment of this disclosure can be referred to.

Figure 9:
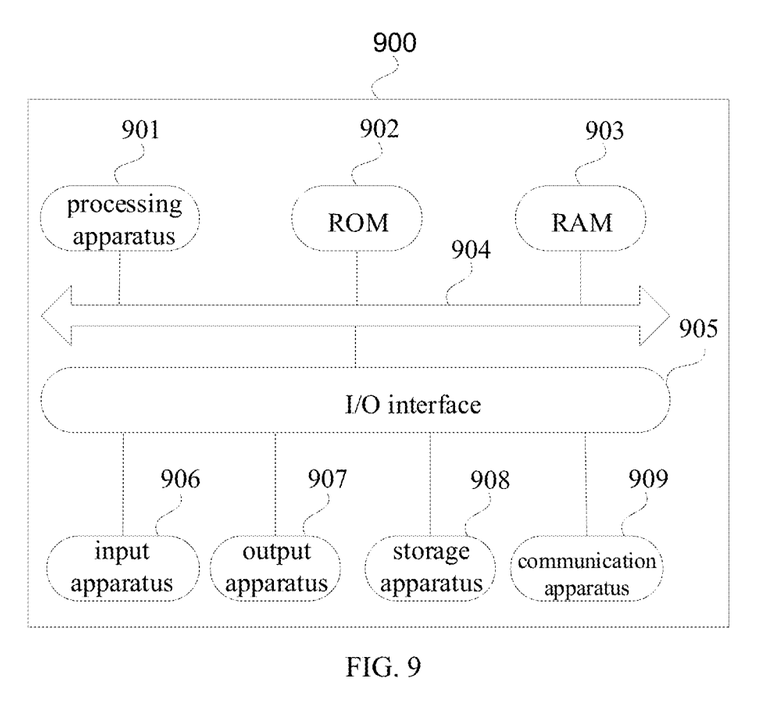
FIG. 9 is schematic structural diagram of an electronic device provided by embodiments of the present disclosure.

Referring to FIG. 9, a schematic structural diagram of an electronic device (e.g., a terminal device) 900 suitable for implementing embodiments of the present disclosure is illustrated. Terminal devices in the embodiments of the present disclosure may include, but are not limited to, mobile terminals such as mobile phones, notebook computers, digital broadcast receivers, personal digital assistants (PDAs), tablets computer (PADs), portable multimedia players (PMPs), vehicle-mounted terminals (such as vehicle-mounted navigation terminals) and fixed terminals such as digital TVs, desktop computers, etc. The electronic device illustrated in FIG. 9 is only an example and should not impose any limitations on the functions and scope of use of the embodiments of the present disclosure.

As illustrated in FIG. 9, the electronic device 900 may include a processing apparatus (e.g., a central processing unit, a graphics processing unit, etc.) 901, which may execute various appropriate actions and processing according to a program stored in a read-only memory (ROM) 902 or a program loaded from a storage apparatus 908 into a random access memory (RAM) 903. The RAM 903 further stores various programs and data required for operation of the electronic device 900. The processing apparatus 901, the ROM 902, and the RAM 903 are connected with each other through a bus 904. An input/output (I/O) interface 905 is also coupled to the bus 904.

Usually, apparatuses below may be coupled to the I/O interface 905: input apparatuses 906 including, for example, a touch screen, a touch pad, a keyboard, a mouse, a camera, a microphone, an accelerometer, a gyroscope, etc.; output apparatuses 907 including, for example, a liquid crystal display (LCD), a speaker, a vibrator, etc.; storage apparatuses 908 including, for example, a magnetic tape, a hard disk, etc.; and a communication apparatus 909. The communication apparatus 909 may allow the electronic device 900 to perform wireless or wired communication with other device to exchange data. Although FIG. 9 illustrates the electronic device 900 including various apparatuses, it should be understood that it is not required to implement or have all the apparatuses illustrated, and the electronic device 900 may alternatively implement or have more or fewer apparatuses.

In particular, according to the embodiments of the present disclosure, the process described above with reference to the flow chart may be implemented as computer software programs. For example, the embodiments of the present disclosure provide a computer program product, which includes a computer program carried on a non-transitory computer readable medium, and the computer program includes program codes for executing the method illustrated in the flow chart. In such embodiments, the computer program may be downloaded and installed from the network via the communication apparatus 909, or installed from the storage apparatus 908, or installed from the ROM 902. When executed by the processing apparatus 901, the computer program may execute the above-described functions defined in the method provided by the embodiments of the present disclosure.

It should be note that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. Examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: display a video play page, wherein an original video image of a currently played video, video information, and a first interactive control are displayed in the video play page, the original video image is displayed in a video play region of the video play page, and the video information and at least one first interactive control are displayed on an upper layer of the original video image; and in response to a first multi-finger operation gesture acting on the video play page, stop displaying the first interactive control and the video information in the video play region, and display a second interactive control in a preset region outside the video play region.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. Examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, example 1 provides a page display method, which comprises:
  displaying a video play page, wherein an original video image of a currently played video, video information, and a first interactive control are displayed in the video play page, the original video image is displayed in a video play region of the video play page, and the video information and at least one first interactive control are displayed on an upper layer of the original video image; and
  in response to a first multi-finger operation gesture acting on the video play page, stopping displaying the first interactive control and the video information in the video play region, and displaying a second interactive control in a preset region outside the video play region.

According to one or more embodiments of the present disclosure, in the method of example 2 according to example 1, stopping displaying the first interactive control and the video information in the video play region comprises:
  stopping displaying all first interactive controls and the video information displayed in the video play page; or
  stopping displaying the first interactive control and the video information located within the video play region.

According to one or more embodiments of the present disclosure, in the method of example 3 according to example 2, stopping displaying all first interactive controls and the video information displayed in the video play page comprises:
  controlling the first interactive controls and the video information to move out of the video play page along a corresponding movement direction.

According to one or more embodiments of the present disclosure, in the method of example 4 according to any one of examples 1-3, after stopping displaying the first interactive control and the video information in the video play region, the method further comprises:
  in response to a control display gesture, re-displaying the first interactive control and the video information in the video play region, and stopping displaying the second interactive control in the preset region, wherein the control display gesture comprises a second multi-finger operation gesture or a single-point sliding gesture along a preset direction.

According to one or more embodiments of the present disclosure, in the method of example 5 according to any one of examples 1-3, the second interactive control comprises a restore control, and after stopping displaying the first interactive control and the video information in the video play region, the method further comprises:
  in response to a triggering operation on the restore control, re-displaying the first interactive control and the video information in the video play region, and stopping displaying the second interactive control in the preset region.

According to one or more embodiments of the present disclosure, in the method of example 6 according to any one of examples 1-3, stopping displaying the first interactive control and the video information in the video play region and displaying the second interactive control in the preset region outside the video play region comprises:
  in response to determining that a triggering duration of the first multi-finger operation gesture is less than a preset duration, stopping displaying the first interactive control and the video information in the video play region, and displaying the second interactive control in the preset region outside the video play region.

According to one or more embodiments of the present disclosure, the method of example 7 according to example 6 further comprises:
  in response to determining that the triggering duration of the first multi-finger operation gesture is greater than or equal to the preset duration, performing an amplification process on the original video image to obtain a target video image, and displaying the target video image in the video play region.

According to one or more embodiments of the present disclosure, the method of example 8 according to example 6, the first multi-finger operation gesture is a two-finger operation gesture, and performing the amplification process on the original video image comprises:
  performing the amplification process on the original video image based on a magnification proportion coefficient and a distance increment between two touch points corresponding to the first multi-finger operation gesture.

According to one or more embodiments of the present disclosure, the method of example 9 according to example 8, performing the amplification process on the original video image based on the magnification proportion coefficient and the distance increment between two touch points corresponding to the first multi-finger operation gesture comprises:
  determining a current magnification proportion coefficient according to a current triggering duration and a preset magnification proportion coefficient curve, and determining a current magnification ratio according to a current distance increment between the two touch points corresponding to the first multi-finger operation gesture, wherein the preset magnification proportion coefficient curve is a curve of the magnification proportion coefficient varying with triggering duration;
  determining a current magnification multiple of a current original video image according to the current magnification proportion coefficient and the current magnification ratio; and
  performing the amplification process on the current original video image based on the current magnification multiple.

According to one or more embodiments of the present disclosure, the method of example 10 according to example 9, in the preset magnification proportion coefficient curve, in response to determining that the triggering duration of the first multi-finger operation gesture is less than the preset duration, the magnification proportion coefficient is less than 1; in response to determining that the triggering duration of the first multi-finger operation gesture is greater than or equal to the preset duration, the magnification proportion coefficient is greater than or equal to 1.

According to one or more embodiments of the present disclosure, the method of example 11 according to example 10, performing the amplification process on the current original video image based on the current magnification multiple comprises:

in response to determining that the current magnification multiple is greater than 1, performing the amplification process on the current original video image based on the current magnification multiple.

According to one or more embodiments of the present disclosure, the method of example 12 according to example 8, in response to the first multi-finger operation gesture acting on the video play page, stopping displaying the first interactive control and the video information in the video play region, and displaying the second interactive control in the preset region outside the video play region, comprises:

during an execution process of the first multi-finger operation gesture acting on the video play page, performing the amplification process on the origin video image based on the magnification proportion coefficient and the distance increment between the two touch points corresponding to the first multi-finger operation gesture to obtain the target video image, and displaying the target video image in the video play region; and in response to determining that the execution of the first multi-finger operation gesture ends and that the triggering duration of the first multi-finger operation gesture is less than the preset duration, stopping displaying the first interactive control and the video information in the video play region, displaying the second interactive control in the preset region outside the video play region, and restoring the target video image displayed in the video play region to the original video image before the magnification process.

According to one or more embodiments of the present disclosure, example 13 provides a page display apparatus, which comprises:

a page display module, configured to display a video play page, wherein an original video image of a currently played video, video information, and a first interactive control are displayed in the video play page, the original video image is displayed in a video play region of the video play page, and the video information and at least one first interactive control are displayed on an upper layer of the original video image; and a response module, configured to, in response to a first multi-finger operation gesture acting on the video play page, stop displaying the first interactive control and the video information in the video play region, and display a second interactive control in a preset region outside the video play region.

According to one or more embodiments of the present disclosure, example 14 provides an electronic device, which comprises:

one or more processors; and a memory, configured to store one or more programs, wherein when the one or more programs are executed by the one or more processors, the one or more processors are caused to implement the page display method according to any one of examples 1-12.

According to one or more embodiments of the present disclosure, example 15 provides a computer-readable storage medium, on which a computer program is stored, wherein when the computer program is executed by a processor, the page display method according to any one of examples 1-12 is implemented.

According to one or more embodiments of the present disclosure, example 16 provides a computer program product, wherein when the computer program product is executed by a computer, the computer is caused to implement the page display method according to any one of examples 1-12.

In addition, although multiple operations are described in a specific order, this should not be understood as requiring them to be executed in the illustrated specific order or in sequential order. In certain environments, multitasking and parallel processing may be advantageous. Similarly, although multiple implementation details are included in the above discussion, they should not be interpreted as limiting the scope of this disclosure. Some features described in the context of individual embodiment can also be combined to be implemented in a single embodiment. On the contrary, multiple features described in the context of a single embodiment can also be implemented separately or in any suitable sub-combination in multiple embodiments.

The invention claimed is:

1. A page display method, comprising:

displaying a video play page, wherein an original video image of a currently played video, video information, and a first interactive control are displayed in the video play page, the original video image is displayed in a video play region of the video play page, and the video information and at least one first interactive control are displayed on an upper layer of the original video image;

during an execution process of a first multi-finger operation gesture acting on the video play page, performing an amplification process on the original video image based on a magnification proportion coefficient and a distance increment between two touch points corresponding to the first multi-finger operation gesture, to obtain a target video image, and displaying the target video image in the video play region; and in response to determining that the execution process of the first multi-finger operation gesture ends and that a triggering duration of the first multi-finger operation gesture is less than a preset duration, stopping displaying the first interactive control and the video information in the video play region, displaying a second interactive control in a preset region outside the video play region, and restoring the target video image displayed in the video play region to the original video image before the amplification process.

2. The method according to claim 1, wherein stopping displaying the first interactive control and the video information in the video play region comprises:

stopping displaying all first interactive controls and the video information displayed in the video play page; or stopping displaying the first interactive control and the video information located within the video play region.

3. The method according to claim 2, wherein stopping displaying all first interactive controls and the video information displayed in the video play page comprises:

controlling the first interactive controls and the video information to move out of the video play page along a corresponding movement direction.

4. The method according to claim 1, wherein, after stopping displaying the first interactive control and the video information in the video play region, the method further comprises:

in response to a control display gesture, re-displaying the first interactive control and the video information in the video play region, and stopping displaying the second interactive control in the preset region, wherein the control display gesture comprises a second multi-finger operation gesture or a single-point sliding gesture along a preset direction.

5. The method according to claim 1, wherein the second interactive control comprises a restore control, and after stopping displaying the first interactive control and the video information in the video play region, the method further comprises:
    in response to a triggering operation on the restore control, re-displaying the first interactive control and the video information in the video play region, and stopping displaying the second interactive control in the preset region.

6. The method according to claim 1, wherein performing the amplification process on the original video image based on the magnification proportion coefficient and the distance increment between two touch points corresponding to the first multi-finger operation gesture comprises:
    determining a current magnification proportion coefficient according to a current triggering duration and a preset magnification proportion coefficient curve, and determining a current magnification ratio according to a current distance increment between the two touch points corresponding to the first multi-finger operation gesture, wherein the preset magnification proportion coefficient curve is a curve of the magnification proportion coefficient varying with triggering duration;
    determining a current magnification multiple of a current original video image according to the current magnification proportion coefficient and the current magnification ratio; and
    performing the amplification process on the current original video image based on the current magnification multiple.

7. The method according to claim 6, wherein, in the preset magnification proportion coefficient curve, in response to determining that the triggering duration of the first multi-finger operation gesture is less than the preset duration, the magnification proportion coefficient is less than 1; in response to determining that the triggering duration of the first multi-finger operation gesture is greater than or equal to the preset duration, the magnification proportion coefficient is greater than or equal to 1.

8. The method according to claim 7, wherein performing the amplification process on the current original video image based on the current magnification multiple comprises:
    in response to determining that the current magnification multiple is greater than 1, performing the amplification process on the current original video image based on the current magnification multiple.

9. A non-transitory computer-readable storage medium, on which a computer program is stored, wherein when the computer program is executed by a processor, the page display method according to claim 1 is implemented.

10. The method according to claim 2, wherein, after stopping displaying the first interactive control and the video information in the video play region, the method further comprises:
    in response to a control display gesture, re-displaying the first interactive control and the video information in the video play region, and stopping displaying the second interactive control in the preset region, wherein the control display gesture comprises a second multi-finger operation gesture or a single-point sliding gesture along a preset direction.

11. The method according to claim 3, wherein, after stopping displaying the first interactive control and the video information in the video play region, the method further comprises:
    in response to a control display gesture, re-displaying the first interactive control and the video information in the video play region, and stopping displaying the second interactive control in the preset region, wherein the control display gesture comprises a second multi-finger operation gesture or a single-point sliding gesture along a preset direction.

12. The method according to claim 2, wherein the second interactive control comprises a restore control, and after stopping displaying the first interactive control and the video information in the video play region, the method further comprises:
    in response to a triggering operation on the restore control, re-displaying the first interactive control and the video information in the video play region, and stopping displaying the second interactive control in the preset region.

13. The method according to claim 3, wherein the second interactive control comprises a restore control, and after stopping displaying the first interactive control and the video information in the video play region, the method further comprises:
    in response to a triggering operation on the restore control, re-displaying the first interactive control and the video information in the video play region, and stopping displaying the second interactive control in the preset region.

14. An electronic device, comprising:
one or more processors; and
a memory, configured to store one or more programs,
wherein when the one or more programs are executed by the one or more processors, the one or more processors are caused to implement the page display method according to claim 2.

15. An electronic device, comprising:
one or more processors; and
a memory, configured to store one or more programs,
wherein when the one or more programs are executed by the one or more processors, the one or more processors are caused to implement the page display method according to claim 3.

16. An electronic device, comprising:
one or more processors; and
a memory, configured to store one or more programs,
wherein when the one or more programs are executed by the one or more processors, the one or more processors are caused to implement the page display method according to claim 4.

17. An electronic device, comprising:
one or more processors; and
a memory, configured to store one or more programs,
wherein when the one or more programs are executed by the one or more processors, the one or more processors are caused to implement the page display method according to claim 5.

18. An electronic device, comprising: one or more processors; and
a memory, configured to store one or more programs,
wherein when the one or more programs are executed by the one or more processors, the one or more processors are caused to implement the page display method according to claim 6.

19. An electronic device, comprising: one or more processors; and
a memory, configured to store one or more programs,
wherein when the one or more programs are executed by the one or more processors, the one or more processors are caused to implement the page display method according to claim 7.

20. An electronic device, comprising:
one or more processors; and
a memory, configured to store one or more programs, wherein when the one or more programs are executed by the one or more processors, the one or more processors are caused to implement:
  displaying a video play page, wherein an original video image of a currently played video, video information, and a first interactive control are displayed in the video play page, the original video image is displayed in a video play region of the video play page, and the video information and at least one first interactive control are displayed on an upper layer of the original video image;
  during an execution process of a first multi-finger operation gesture acting on the video play page, performing an amplification process on the original video image based on a magnification proportion coefficient and a distance increment between two touch points corresponding to the first multi-finger operation gesture, to obtain a target video image, and displaying the target video image in the video play region; and
  in response to determining that the execution process of the first multi-finger operation gesture ends and that a triggering duration of the first multi-finger operation gesture is less than a preset duration, stopping displaying the first interactive control and the video information in the video play region, displaying a second interactive control in a preset region outside the video play region, and restoring the target video image displayed in the video play region to the original video image before the amplification process.

* * * * *